June 6, 1961  M. A. YAKUBIK  2,987,103
LAMINATED POLYVINYL CHLORIDE SHEETS AND METHOD OF MAKING SAME
Filed March 6, 1958
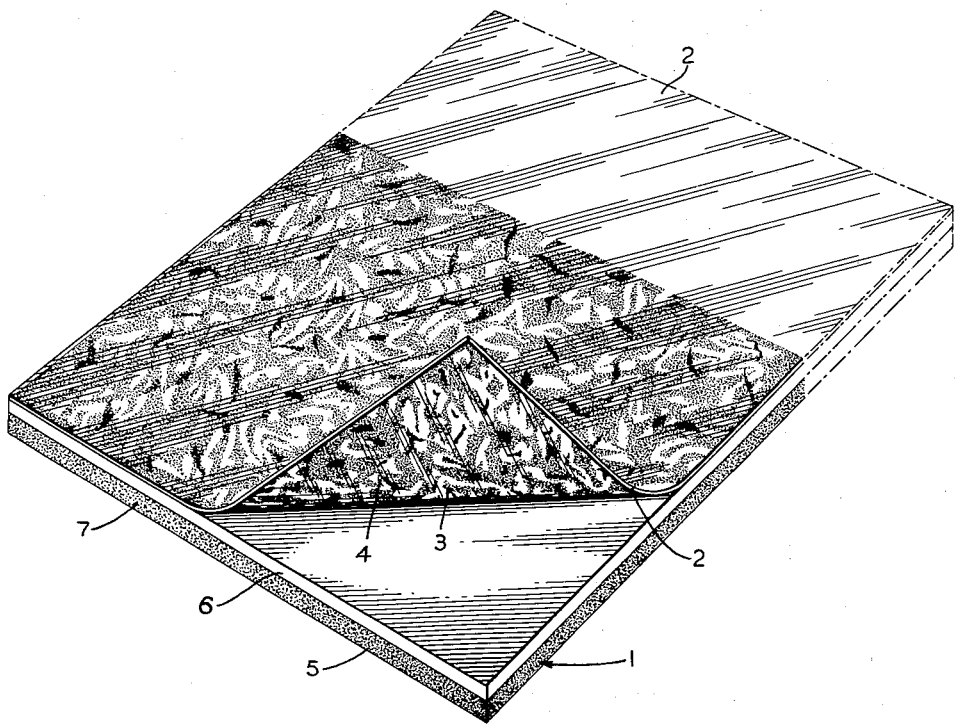
INVENTOR.
MICHAEL A. YAKUBIK
BY
*R. L. Miller*
ATTORNEY

United States Patent Office 2,987,103
Patented June 6, 1961

2,987,103
LAMINATED POLYVINYL CHLORIDE SHEETS AND METHOD OF MAKING SAME

Michael A. Yakubik, Hudson, Ohio, assignor to The Goodyear Tire & Rubber Company, Akron, Ohio, a corporation of Ohio
Filed Mar. 6, 1958, Ser. No. 719,631
9 Claims. (Cl. 154—25)

This invention relates to floor, wall covering of the hard surface type and more particularly concerns a decorative floor, wall covering of this type in which the decoration is protected by a clear, transparent, wear-resistant film or coating and a practical and economical method of manufacturing such coverings to maintain the coverings dimensionally stable.

In the manufacture of laminates formed of a plurality of lamina plied together, the individual lamina are formed by calendering processes wherein the use of heat renders the material plastic, the working or kneading of the thermoplastic material invariably introduces in the sheets or strips certain stresses and strains which will eventually be translated into certain detrimental curling effects, among others, in the finished products. Unless these stresses and strains incident to the manufacture of individual strips or sheets of thermoplastic material are removed, serious and unpredictable shrinkages will occur slowly at room temperatures and more rapidly at elevated temperatures.

The residual shrinkage characteristics of a ply of thermoplastic material is dependent upon the composition thereof, the thickness thereof, the degree of kneading or masticating, and the coefficient of expansion of the material. If a laminated product is made of several lamina each of which is of the same composition and thickness and masticated to the same degree, it is relatively simple to laminate such lamina so that the finished product will not curl because any residual shrinkage in the individual lamina will be uniform. However, if, as is usual, the thickness, composition, degree of masticating and coefficient of expansion are different then it becomes exceedingly difficult to laminate sheets of thermoplastic material without the finished product curling because the individual lamina will tend to shrink at different rates and cause the laminate to curl in one direction or the other depending on which lamina has the stronger residual shrinking forces.

Theoretically it would be possible to control the residual shrinkage of lamina which are of different thickness, composition, etc. so that the finished laminate would not curl, but this is quite difficult or impossible in practice. It has been discovered, however, that in making a flooring material in which the plies are all of thermoplastic composition but containing varying amounts of resin and all the plies are of varying thicknesses that it is possible to reduce the residual shrinkage of the individual lamina to a practical amount and control the direction of the curling of the laminate so as to produce a finished laminate which will not curl any substantial amount during use and any curling which does occur is controlled directionwise.

It is an object of the present invention to provide a process for the manufacture of calendered thermoplastic sheet material into a multi-plied laminate having a thin transparent top ply of high resin content in which the direction of curling caused by any latent shrinkage of the laminae is controlled.

A further object of the invention is to provide a floor, wall covering, or the like having a transparent top ply of high resin content which may be decorated by various colors or color combinations and which is resistant to curling during use.

In the drawings FIG. 1 is an isometric view of the completed sheet material of the present invention.

Referring to FIG. 1, floor or wall covering 1 of the present invention comprises a thin top ply 2 of 6 to 12 mils which is preferably transparent but may contain suitable coloring dyes or tinting materials to provide a colored transparent or translucent top ply 2. The transparent ply 2 is made from a synthetic resin thermoplastic composition of high resin content, preferably a polyvinyl chloride resin, or from any of the vinyl copolymers. The plastic composition includes a plasticizer of from 5 to 30% by weight and is either entirely or substantially free from fillers to provide a tough, wear resistant and scratch resistant top ply for the end product 1.

The following is an example of a composition for the top ply 2:

| Composition of top ply— | Parts by weight |
|---|---|
| Polyvinyl chloride | 80 |
| Plasticizer such as dioctylphthalate | 18 |
| Stabilizer | 2 |
| | 100 |

In accordance with the present invention, the underside 3 of the film 2 is provided with a dull surface upon which is printed a decorative design 4 with a vinyl solution type ink. The dull side 3 of the film 2 is fused to an opaque backing material 5 which is preferably made of two plies of material 6 and 7 of approximately equal thickness to provide an overall thickness for the covering 1 of from 40 to 100 mils.

In the preferred form of the invention, the ply 6 is made of an opaque composition of a synthetic resin which may contain fillers and coloring material and is relatively lower in resin content than the film 2 to provide a resilient layer for the sheet material and a background of opaque color for the printed design 4 on the film 2. A typical composition for the intermediate ply 6 is as follows:

| Composition of intermediate ply— | Parts by weight |
|---|---|
| Polyvinyl chloride | 25 |
| Plasticizer | 16 |
| Stabilizer | 2 |
| Filler | 57 |
| | 100 |

The opaque bottom ply 7 of the backing material 5 is likewise made of a synthetic resin composition containing fillers and the like and is of relatively lower resin content than the film 2 and the intermediate ply 6. A typical composition for the bottom ply 7 is as follows:

| Composition of bottom ply— | Parts by weight |
|---|---|
| Polyvinyl chloride | 23 |
| Plasticizer | 10 |
| Stabilizer | 1 |
| Filler | 66 |
| | 100 |

In accordance with the present invention, the composition of the film 2 and the plastic composition of the intermediate ply 6 and bottom ply 7 are each prepared in the usual manner under heat on a rolling mill and the heated compositions are then calendered into sheets. Preferably, the sheets are calendered on a 4-roll calender in which the last roll in the calender roll train is provided with a pitted or matted surface, formed by impinging abrasive particles against the surface thereof to produce a dull surface on one side of each of the plies 2, 6 and 7. The surface of the last roll of the calender should be such that the gloss rating for the underside 3 of the film 2 is under 20 on a standard gloss meter such as a Gardner portable 60° gloss meter, manufactured by Henry A. Gardner, Inc., Bethesda, Maryland.

Applicant has discovered that in calendering the individual plies or lamina in the manner described above any residual tendency of the plies to curl in the final product 1 can be controlled directionally. It has been discovered that the curling will occur in a direction towards the dull side of the film or from the top ply 2 towards the bottom ply 7. Since the top ply 2 is made of a composition having a high resin content the shrinking forces thereof are comparatively larger than the shrinking forces of the other two plies 6 and 7. It is, therefore, critical to this invention that at least the top ply 2 be fused with the backing material 5 with the dull side down or against the backing material 5 and, preferably, the dull side of at least one of the plies 6 and 7 facing downwardly or towards the bottom side of the product 1. Since the dull side 2 of the film 1 is slightly matted, the dull side provides an efficient surface upon which to apply any desired printed decoration and provides an efficient surface for fusing the film 2 to the backing material 5.

After the several plies 2, 6 and 7 have been calendered they are individually heated in an oven in a relaxed condition to approximately 300° F. so as to relieve the residual shrinkage tendencies of the plies prior to lamination. After the individual plies have been heated they are passed through a laminating apparatus, preferably a continuous press, wherein pressure is applied to the lamina to cause the lamina to fuse together into a unitary product. Thereafter the material is passed through an annealing oven in a relaxed condition to further relieve any stresses in the laminated product 1, after which the laminated sheeting is further pressed and/or polished prior to cooling. After cooling the laminated sheeting may be cut into tiles or sheets according to the requirements of the particular use involved.

Certain variations from the techniques described above are permissible without departing from the spirit of the invention. For example, the background for the printed decoration on the film 2 may be provided by overprinting the decorated side of the film with a printed solid color of vinyl ink, or the backing material 5 may be made of a single ply which is covered with a thin vinyl solution forming an opaque coating thereon against which the film 2 is fused with the printed side down.

While certain representative embodiments and details have been shown for the purpose of illustrating the invention, it will be apparent to those skilled in this art that various changes and modifications may be made therein without departing from the spirit or scope of the invention.

I claim:

1. A method of making a laminated decorative plastic material suitable as a floor covering, comprising forming a thin transparent thermoplastic resin film, forming at least one thermoplastic opaque backing sheet of thicker gauge and lower resin content than said film, said film and said sheet each being formed on a calender whereby the film and sheet tend to curl in a direction towards the side thereof which was engaged by the last roll of the calender, superimposing the side of said film which was engaged by the last roll of the calender against said backing sheet and applying heat and pressure to fuse the film and sheet into a unitary product, whereby the tendency of the unitary product to curl during use is alleviated.

2. A method as claimed in claim 1 in which the surface of at least one of said backing sheets which was engaged by the last roll of said calender faces the bottom side of said unitary product.

3. A method of making a laminated decorative plastic material suitable as a floor covering comprising forming a thin transparent thermoplastic resin film, forming at least one thermoplastic opaque backing sheet of thicker gauge and lower resin content than said film, said film and said sheet each being formed on a calender whereby the film and sheet tend to curl in a direction toward the side thereof which was engaged by the last roll of the calender, printing a decorative design on the surface of said film which was engaged by the last roll of said calender, superimposing the printed side of said film against said sheet and applying heat and pressure to fuse the film and sheet into a unitary product, whereby the tendency of said unitary product to curl during use is alleviated.

4. A method as claimed in claim 3 in which the surface of at least one of said backing sheets which was engaged by the last roll of said calender faces the bottom side of said unitary product.

5. A method of making a laminated decorative material suitable as a floor covering comprising forming a thin transparent thermoplastic resin film, filming at least one thermoplastic opaque backing sheet of thicker gauge and lower resin content than said film, said film and said sheet each being formed on a calender having a matted surface on the last roll of the calender whereby one side of said film and one side of said sheet is duller than the other side thereof, printing a decorative design on the duller side of said film, superimposing the film on said backing sheet with the printed side of said film against said backing sheet, and applying heat and pressure to fuse the film and sheet into a unitary product whereby the tendency of the unitary product to curl during use is alleviated.

6. A method as claimed in claim 5 in which the surface of at least one of said backing sheets which was engaged by the matted roll of said calender faces the bottom side of said unitary product.

7. A decorative plastic sheeting material suitable as a floor covering comprising a top ply of calendered transparent film and at least one thermoplastic opaque backing sheet of thicker gauge and lower resin content than said film, said film having one side which is printed with a decorative design, said calendered film having a tendency to curl in a direction towards the said one side, said film being laminated to said backing sheet with said printed side in contact and fused with said opaque backing sheet.

8. A decorative plastic sheeting material as claimed in claim 7 in which said film and backing material comprises polyvinylchloride resin.

9. A decorative plastic sheeting material suitable as a floor covering comprising a top ply of calendered transparent polyvinylchloride resin film, said film having a dull surface formed during the calendering thereof on which is printed a decorative design, said film having a tendency to curl in a direction toward said printed surface, said film being fused to a backing ply of lower resin content and of thicker gauge than said film with said printed side in contact and fused with said opaque backing sheet.

References Cited in the file of this patent

UNITED STATES PATENTS

| 2,617,750 | Le Clair | Nov. 11, 1952 |
| 2,622,991 | Sturm | Dec. 23, 1952 |
| 2,748,042 | Borgese | May 29, 1956 |
| 2,836,528 | Ford | May 27, 1958 |

FOREIGN PATENTS

| 549,929 | Canada | Dec. 10, 1957 |